UNITED STATES PATENT OFFICE.

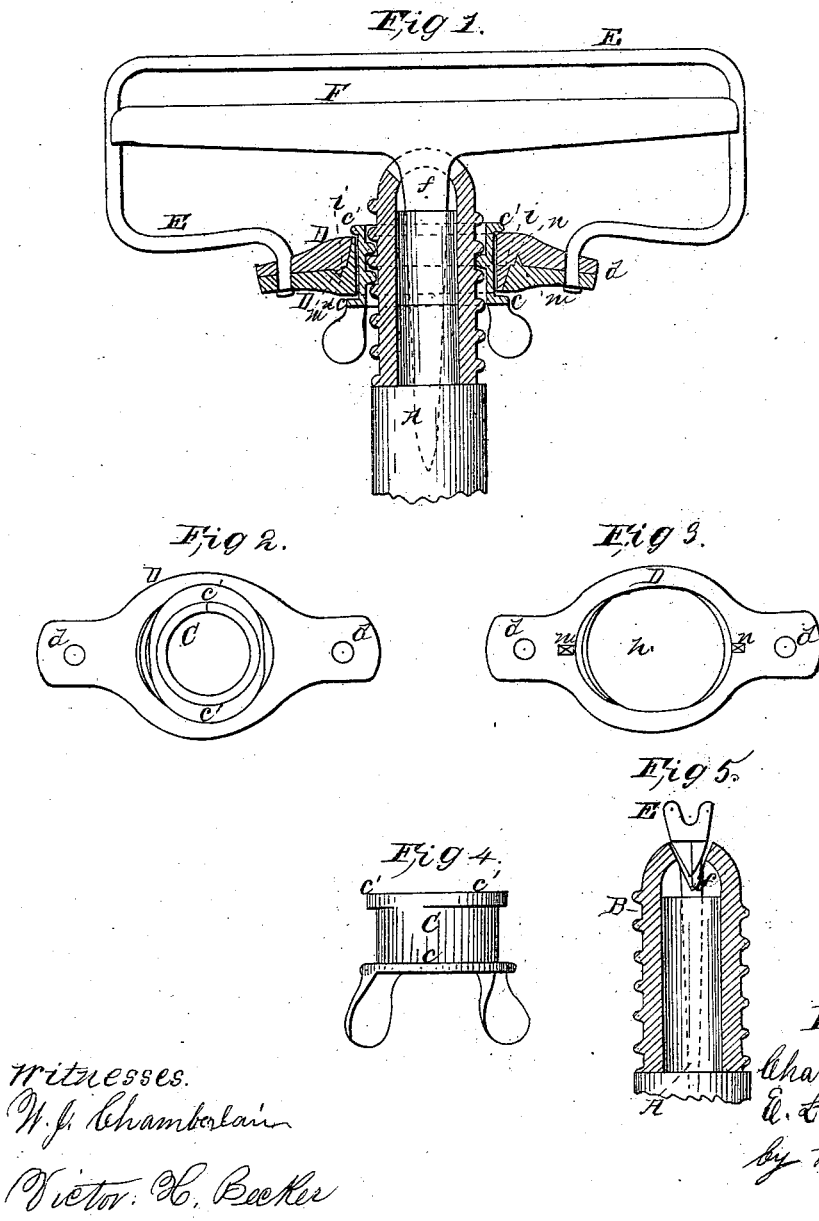

CHARLES B. CLARK AND E. L. FERGUSON, OF BUFFALO, NEW YORK.

IMPROVED MOP-HEAD.

Specification forming part of Letters Patent No. 82,383, dated September 22, 1868.

*To all whom it may concern:*

Be it known that we, CHARLES B. CLARK and E. L. FERGUSON, of the city of Buffalo, in the county of Erie and State of New York, have invented certain new and useful Improvements in Mop-Heads; and we do hereby declare that the following is a full and exact description thereof, reference being had to the accompanying drawing, in which—

Figure I is a partially-sectional view of a mop-head provided with our improvements. Fig. II is a bottom plan of the collar and clamping-nut. Fig. III is a plan of one portion of the collar. Fig. IV is a side elevation of the clamping-nut detached. Fig. V is a sectional view of the screw-ferrule, showing the shank of the cross-head inserted in place in the handle.

Like letters of reference designate like parts in all the figures.

The invention relates to that class of mop-heads in which the mop-cloth is clamped by means of a nut traversing a screw-shank, and carrying with it a surrounding collar, to the ears of which the ends of the rod or wire are attached.

The invention consists in forming the said collar in two portions, each provided with an oval opening, to admit the insertion of the lower end of the nut, constructed with a projecting flange on two opposite sides, each of the said portions of the collar being provided with a ledge that will fit in the end of the elongated opening of the other, after they have been adjusted together on the nut, and prevent the latter being withdrawn.

In the drawings, A represents the lower end of the wooden handle, on which is fitted ferrule B, provided with an external thread, on which traverses the thumb-nut C. D D are the two portions of the collar encircling the nut, provided with ears $d\ d$, in which are riveted the ends of the binding rod or wire E, which also serve to fasten the parts D D together. F is the cross-head, against which the binder E presses in clamping the mop-cloth. This cross-head is formed with a shank, $f$, which fits in V-shaped opening in the end of ferrule B, as it is driven into the ends of the handle A, when it acts as a wedge to secure the three parts together, as is clearly represented in Figs. I and V.

The nut C is cast with a flange, $c$, at the upper edge, and flanges $c'\ c'$ at the lower edge, as shown most clearly in Figs. II and IV, which serve to retain the collar D in place when the parts thereof are adjusted on the nut, as will presently be explained. The portions D D of the collar are to be formed in a similar manner, so, when riveted together by the ends of the binders, as before described, they will form a single collar. The openings $h\ h$ in them are elongated, to admit the passage of the flanges $c'\ c'$ in adjusting the parts on the nut.

From the contiguous sides of the portions D D, at opposite ends of the opening $h$, extend flanges or ledges $i$, of the form of the elongated end of the opening, and of a thickness equal to the said elongation, or the eccentricity of the opening, so that as the second or lower half of the collar is adjusted on the nut each of these ledges will fit in the end of the opening of the other and around the nut, so as to form a circular opening, and prevent the withdrawal of the nut by the flange $c'$ stopping against the end of the ledges $i$, as shown in Fig. I. When the nut is turned so as to occupy any other relative position, the sides of the openings in the collar will act as a stop for the flange $c'$, as represented in Fig. II.

The contiguous surface of the parts D D of collar may be cast with a dent and indent, $m\ n$, which, engaging with each other perfectly, insures the retaining of the parts in their proper relative position when brought together.

The clamping and releasing of the mop-cloth are effected, in the usual manner, by turning the nut C by means of its thumb-pieces, which causes the collar to advance and recede with it, and the binder to approach and recede from the cross-head, between which the cloth is clamped.

What we claim as our invention, and desire to secure by Letters Patent, is—

The nut C, provided with flanges $c\ c'$, or equivalent, in combination with the collar portions D D, formed with elongated openings $h$ and ledges $i$, substantially in the manner and for the purpose set forth.

C. B. CLARK.
E. L. FERGUSON.

Witnesses:
W. J. CHAMBERLAIN,
VICTOR H. BECKER.